United States Patent Office 2,946,818
Patented July 26, 1960

2,946,818

PREPARATION OF HYDROXY MERCAPTO BUTYRIC ACIDS AND DERIVATIVES THEREOF

Constantine E. Anagnostopoulos, Waltham, and Robert J. Wineman, Concord, Mass., assignors to Monsanto Chemical Company, St. Louis, Mo., a corporation of Delaware No Drawing. Filed Oct. 1, 1953, Ser. No. 383,694

1 Claim. (Cl. 260—535)

The present invention relates to novel hydroxy butyric acids containing mercapto groups, and to derivatives of such acids, and methods of preparing such compounds. More particularly the invention relates to the preparation of alpha-hydroxy-gamma-mercapto butyric acid and derivatives thereof.

It is a primary object of the invention to provide hydroxy mercapto butyric acid compounds, and derivatives thereof, which are highly useful as additives to poultry feed compositions to promote growth or for the purpose of increasing the effective utilization of the feed by the poultry.

Still further objects and advantages of the invention will become apparent from the following description and appended claim.

The preparation of the hydroxy mercapto butyric acids of the present invention can be exemplified by the process of preparing alpha-hydroxy-gamma-mercapto butyric acid and its alkaline earth metal salts. The process is in general carried out by reacting hydrocyanic acid with beta-acetylthiopropion-aldehyde in the presence of a basic catalyst. Preferably an excess of the hydrocyanic acid is added to the propionaldehyde in the presence of about 1% catalyst. The resulting cyanohydrin is treated directly with sulfuric acid, which hydrolyzes the cyanohydrin to the corresponding alpha-hydroxy acid and at the same time hydrolyzes the acetylthio grouping to form the corresponding free mercaptan and acetic acid. The reaction mixture is then heated, preferably at some temperature between 80° and 110° C., and finally neutralized with an excess of calcium hydroxide or other alkaline earth metal hydroxide, such as barium or magnesium hydroxide. This produces a thick precipitate, which in the case of calcium hydroxide, is mostly calcium sulfate. After removing the precipitate by filtration, the remaining clear filtrate is evaporated to a smaller volume (preferably a quarter or less of its original volume), and is then cooled to precipitate the calcium or other alkaline earth metal salt of the hydroxy mercapto butyric acid. When calcium hydroxide is used, this salt is the calcium salt of alpha-hydroxy-gamma-mercapto butyric acid, which is the calcium salt of the alpha-hydroxy analogue of homocysteine.

The free alpha-hydroxy-gamma-mercapto butyric acid can be obtained by a variation of the above procedure, in accordance with which the reaction mixture resulting from the hydrolysis with sulfuric acid, instead of being neutralized with an excess of calcium hydroxide or other alkaline earth metal hydroxide is treated with a calculated amount of alkaline earth metal hydroxide or carbonate sufficient only to precipitate all the sulfate ions as the corresponding sulfate, which is filtered off. The clear filtrate is then extracted with ether or other water-immiscible organic solvent after which the solvent layer is separated and the solvent is evaporated. An oily residue remains, which is distilled under reduced pressure. The portion boiling between 160° C. at a pressure of 27 mm. of Hg and 160° C. at a pressure of 29 mm. of Hg is the gamma-thiolactone of alpha-hydroxy-gamma-mercapto butyric acid, which has the following formula:

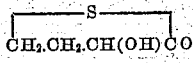

If desired, the neutralization step to precipitate the sulfate ions may be omitted, and instead the acidic hydrolysis mixture may be cooled, preferably to 20 to 35° C., and then extracted and distilled as hereinbefore described.

The corresponding free hydroxy mercapto butyric acid is obtained from this lactone by reacting it with a mineral acid, extracting with ether or other water-immiscible organic solvent, after which the solvent layer is separated and the solvent is evaporated. The viscous liquid thus obtained is alpha-hydroxy-gamma-mercapto butyric acid.

Alternatively the free hydroxy mercapto butyric acid can be prepared by hydrolyzing the cyanohydrin of beta-acetyl-thiopropionaldehyde with sulfuric acid as hereinbefore described, extracting the resulting acidic hydrolysis mixture with a water-immiscible organic solvent, and evaporating the solvent.

In addition to the calcium salt of the above hydroxy mercapto butyric acid, it is also possible to prepare the ammonium and alkali metal salts including for example the sodium and potassium salts. These may be prepared by careful neutralization of the acid, or solution of the acid, with ammonia, or suitable alkali metal hydroxide.

The various compounds prepared as described above, and otherwise forming a part of this invention, may be represented by the general formula:

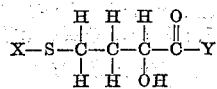

where X represents —H, Y represents —OH, —ONH$_4$, —O-alkali metal, —O-alkaline earth metal —OH, or —O-alkaline earth metal

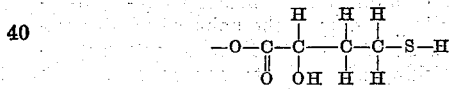

and X and Y together represent S.

The salts so prepared are crystalline solids, which are soluble in hot water, but not soluble in the usual organic solvents. The free acids are viscous liquids, which could not be obtained in crystalline form. They are soluble in water, and in certain organic solvents, such as ethyl alcohol, diethyl ether, acetone and other polar solvents. All of these compounds are useful in poultry feeds when added in quantities between 0.005 and 1.0% by weight, based on the feed or ration, to promote the growth of the poultry and/or to improve the efficiency of feed utilization by the poultry. The amounts employed within this range are dependent on the particular poultry feed compositions used. They are also useful as intermediates in the preparation of other organic compounds.

A further understanding of the compounds and processes of this invention will be obtained from the following examples, parts and percentages being by weight unless otherwise specified.

Example I

Preparation of calcium alpha-hydroxy-gamma-mercapto butyrate:

Twenty-five and two-tenths grams (0.945 mol) of liquid hydrocyanic acid were added to a well-stirred mixture of 100 grams (0.9 mol) of beta-acetylthiopropionaldehyde (boiling point 92 to 93° C. at a pressure of 14 mm. of Hg) and 1 gram of pyridine. The addition took 45 minutes and the reaction mixture was kept at 30 to 40° C. by continuous external cooling. Stirring was continued for an additional 30 minutes, after which time the excess of hydrocyanic acid was removed by the application of a pressure of 25 mm. of Hg.

The resulting cyanohydrin was directly hydrolyzed by the slow addition of a mixture of 124 grams of concentrated (97%) sulfuric acid and 92 ml. of water. The reaction mixture was kept at about 35 to 40° C. by external cooling. Sufficient water was then added to make a 20 to 25% aqueous sulfuric acid solution which was thereupon heated at 80° C. for 2 hours. Fifty-five grams of zinc dust were then added for a period of 1 hour while maintaining the reaction mixture at about 75° C. This was done to reduce any dialkyl disulfide that might have been formed to the free mercaptan.

The resulting solution was cooled to room temperature and 150 grams (1.5 mols) of calcium carbonate was added to precipitate all the sulfate ions present as calcium sulfate. The resulting precipitate was filtered off and the clear filtrate further diluted with 100 ml. of water and heated to about 52° C. A calculated amount of calcium hydroxide, 33.3 grams (0.45 mol), was then added sufficient to transform all of the alpha-hydroxy-gamma-mercapto butyric acid to its calcium salt. A small amount of solid material precipitated and was removed by filtration. The clear filtrate was then treated with decolorizing charcoal, filtered and evaporated to a volume of about 100 ml. at which time solids began to separate. On cooling, the calcium alpha-hydroxy-gamma-mercapto butyrate precipitated and was separated by filtration. After drying, the precipitate weighed 62 grams. An additional quantity of the calcium butyrate was obtained upon further evaporation of the filtrate. Calculated on the basis of the formula $(C_4H_7O_3S)_2Ca$; C=30.95%, H=4.54%, S=20.65%, Ca=12.91% and O=30.95%. Found by analysis; C=30.9%, H=4.5%, S=20.6%, Ca=13.0% and O=31.0% (by difference).

Example II

Preparation of the gamma-thiolactone of alpha-hydroxy-gamma-mercapto butyric acid.

The reactions were carried out as described in Example I for the preparation of the calcium alpha-hydroxy-gamma-mercapto butyrate up to the point where the precipitate was removed after the addition of calcium carbonate. The resulting clear filtrate was extracted with five portions of 250 ml. each of ether, and the ethereal layer was washed with 250 ml. of water and dried over sodium sulfate. Evaporation of the ether left an oily residue which was distilled under reduced pressure. The fraction boiling between 160° C. at a pressure of 27 mm. of Hg and 160° C. at a pressure of 29 mm. of Hg was collected and identified as the gamma-thiolactone of alpha-hydroxy-gamma-mercapto butyric acid. Calculated on the basis of the formula $C_4H_6O_2S$; C=40.65%, H=5.12%, S=27.14% and O=27.09%. Found by analysis; C=40.7%, H=5.3%, S=27.2% and O=26.8% (by difference).

Example III

Preparation of alpha-hydroxy-gamma-mercapto butyric acid.

The thiolactone prepared as described in Example II was converted to the free alpha-hydroxy-gamma-mercapto butyric acid in the following manner. Ten grams of the thiolactone was placed in 100 ml. of 37% hydrochloric acid and warmed for five minutes on a steam bath. The cooled, clear solution was then extracted with three portions of 100 ml. each of ether and the combined ethereal solutions were dried over sodium sulfate. The ether was then removed under a reduced pressure of 25 mm. of Hg, leaving as residue the alpha-hydroxy-gamma-mercapto butyric acid. The neutralization equivalent of the acid was 142 (calculated neutralization equivalent: 136). The calcium salt of the acid was prepared in the conventional manner, that is, by adding calcium hydroxide to an aqueous solution of the acid and evaporating to a small volume, at which time the calcium salt precipitated out. The calcium salt so prepared was identical with the calcium salt prepared as described in Example I by comparison of infrared spectra.

What is claimed is:

The method of preparing calcium alpha-hydroxy-gamma-mercapto butyrate which comprises reacting hydrocyanic acid with beta-acetylthiopropionaldehyde in the presence of a basic amine catalyst, hydrolyzing the resulting cyanohydrin with sulfuric acid, heating the reaction mixture at a temperature between 80° and 110° C., neutralizing it with an excess of calcium hydroxide, filtering off the precipitated calcium sulfate, evaporating the filtrate to a volume not more than one-quarter its original volume, and allowing the solution to cool, whereby a precipitate is formed.

References Cited in the file of this patent

UNITED STATES PATENTS

| 2,402,639 | Lazier | June 25, 1946 |

FOREIGN PATENTS

| 874,913 | Germany | Apr. 27, 1953 |

OTHER REFERENCES

Jacobson, J.A.C.S., 68: 2628 (1946).
Wagner and Zook: Synthetic Org. Chem., John Wiley and Sons (1953).
Akobe et al.: Chem. Abstracts 31: 736[5] (1937).
Koelsch, J.A.C.S. 52: 1107 (1930).